United States Patent
Taniguchi et al.

(10) Patent No.: US 10,647,826 B2
(45) Date of Patent: May 12, 2020

(54) CURABLE EPOXY RESIN COMPOSITION, AND FIBER-REINFORCED COMPOSITE MATERIAL OBTAINED USING SAME

(71) Applicant: NIPPON STEEL & SUMIKIN CHEMICAL CO., LTD., Tokyo (JP)

(72) Inventors: Yuichi Taniguchi, Tokyo (JP); Kyohei Kano, Tokyo (JP); Naoki Yokoyama, Tokyo (JP)

(73) Assignee: NIPPON STEEL CHEMICAL & MATERIAL CO., LTD., Tokyo (JP)

(*) Notice: Subject to any disclaimer, the term of this patent is extended or adjusted under 35 U.S.C. 154(b) by 109 days.

(21) Appl. No.: 15/764,448

(22) PCT Filed: Sep. 30, 2016

(86) PCT No.: PCT/JP2016/079050
§ 371 (c)(1),
(2) Date: Mar. 29, 2018

(87) PCT Pub. No.: WO2017/057689
PCT Pub. Date: Apr. 6, 2017

(65) Prior Publication Data
US 2019/0055369 A1  Feb. 21, 2019

(30) Foreign Application Priority Data

Sep. 30, 2015 (JP) ................. 2015-192798

(51) Int. Cl.
| C08J 5/00 | (2006.01) |
| C08G 59/42 | (2006.01) |
| C08G 59/38 | (2006.01) |
| C08G 59/68 | (2006.01) |
| B29C 70/28 | (2006.01) |
| B29K 63/00 | (2006.01) |

(52) U.S. Cl.
CPC .............. *C08J 5/005* (2013.01); *C08G 59/38* (2013.01); *C08G 59/4215* (2013.01); *C08G 59/4238* (2013.01); *C08G 59/686* (2013.01); *B29C 70/28* (2013.01); *B29K 2063/00* (2013.01); *C08J 2363/00* (2013.01)

(58) Field of Classification Search
USPC .......................... 525/523, 530, 529; 523/429
See application file for complete search history.

(56) References Cited

U.S. PATENT DOCUMENTS

| 8,883,938 | B2 | 11/2014 | Kobayashi et al. |
| 8,981,160 | B2 * | 3/2015 | Nakanishi ............ C08G 59/063 |
| | | | 568/640 |
| 2006/0159928 | A1 | 7/2006 | Motobe et al. |
| 2008/0081170 | A1 | 4/2008 | Tilbrook et al. |
| 2010/0179353 | A1 | 7/2010 | Nakanishi et al. |

FOREIGN PATENT DOCUMENTS

| JP | 7-268320 A | 10/1995 | |
| JP | 10-259227 A | 9/1998 | |
| JP | 2000-95975 A | 4/2000 | |
| JP | 2000-160063 A | 6/2000 | |
| JP | 2004-285148 A | 10/2004 | |
| JP | 2008-038082 A * | 2/2008 | ............ C08G 59/58 |
| JP | 2010-505990 A | 2/2010 | |
| JP | 4872139 B2 | 2/2012 | |
| JP | 5028903 B2 | 9/2012 | |
| JP | 2013-1711 A | 1/2013 | |
| JP | 5397265 B2 | 1/2014 | |
| JP | 2014-167102 A | 9/2014 | |
| JP | 2016-60747 A | 4/2016 | |
| WO | WO 2004/108791 A1 | 12/2004 | |
| WO | WO 2007/083715 A1 | 7/2007 | |
| WO | WO 2008/020594 A1 | 2/2008 | |

OTHER PUBLICATIONS

Online translation of Detailed Description of JP 2008-038082A; publication date: Feb. 2008 (Year: 2008).*
Online translation of Detailed Description of JP 53-68707A; publication date: Jul. 2007 (Year: 2007).*
English translation of International Preliminary Report on Patentability issued in PCT/JP2016/079050 dated Apr. 5, 2018.
International Search Report, issued in PCT/JP2016/079050, dated Nov. 8, 2016.
Written Opinion of the International Searching Authority, issued in PCT/JP2016/079050, dated Nov. 8, 2016.

* cited by examiner

*Primary Examiner* — Fred M Teskin
(74) *Attorney, Agent, or Firm* — Birch, Stewart, Kolasch & Birch, LLP

(57) ABSTRACT

Provided is a resin composition to be suitably used as the matrix resin of a fiber-reinforced composite material excellent in fatigue resistance. In the resin composition for a fiber-reinforced composite material, 50 mass % or more of an epoxy resin (A) includes a phenol novolac-type epoxy resin containing a compound represented by the following general formula (1) and a compound represented by the following general formula (2), and in gel permeation chromatography measurement, the phenol novolac-type epoxy resin contains a body corresponding to m=0 at a ratio of 75% by area or more and a body corresponding to m=1 at a ratio of 6% by area or less.

5 Claims, 1 Drawing Sheet

Prior Art

CURABLE EPOXY RESIN COMPOSITION, AND FIBER-REINFORCED COMPOSITE MATERIAL OBTAINED USING SAME

TECHNICAL FIELD

The present invention relates to a resin composition that has a low viscosity and is excellent in long-term viscosity stability, the resin composition serving as a matrix resin material for a fiber-reinforced composite material that provides a molded product having high heat resistance and high toughness at the time of its curing.

BACKGROUND ART

A fiber-reinforced composite material has been widely applied as a structural material for an aircraft, an automobile, civil engineering and construction, sporting goods, and the like because the material includes reinforcing fibers, such as glass fibers, aramid fibers, or carbon fibers, and a thermosetting matrix resin, such as an unsaturated polyester resin, a vinyl ester resin, an epoxy resin, a phenol resin, a benzoxazine resin, a cyanate resin, or a bismaleimide resin, has a light weight, and is excellent in mechanical properties, such as a strength, corrosion resistance, and fatigue resistance.

The production of the fiber-reinforced composite material is performed by an approach, such as an autoclave molding method or a press molding method involving using a prepreg obtained by impregnating the reinforcing fibers with the thermosetting matrix resin in advance, or a wet lay-up molding method, a pultrusion molding method, a filament winding molding method, or a RTM method including a step of impregnating the reinforcing fibers with a liquid matrix resin and a molding step based on heat curing. In the wet lay-up molding method, the pultrusion molding method, the filament winding molding method, or the RTM method out of those methods, a matrix resin having a low viscosity is used in order that the reinforcing fibers may be immediately impregnated with the resin.

In addition, in the wet lay-up molding method, the pultrusion molding method, or the filament winding molding method out of those methods, a matrix resin showing a small viscosity increase ratio during the step of impregnating the reinforcing fibers with the resin is used for securing stable impregnability.

With regard to the tensile elongation at break of each of the reinforcing fibers to be used in the fiber-reinforced composite material, in general, the glass fibers each show a value of from 3% to 6%, the aramid fibers each show a value of from 2% to 5%, and the carbon fibers each show a value of from 1.5% to 2.0%. Accordingly, a material having a tensile elongation at break higher than that of any such reinforcing fiber is desirably applied as the matrix resin for obtaining a fiber-reinforced composite material excellent in strength.

In the wet lay-up molding method, the pultrusion molding method, or the filament winding molding method, a thermosetting resin, such as an unsaturated polyester resin, a vinyl ester resin, or an epoxy resin, has heretofore been used. Each of the unsaturated polyester resin and the vinyl ester resin each having radical polymerizability has a low viscosity and is excellent in fast curability, but involves a problem in that the mechanical properties of a molded product, such as heat resistance, a strength, and toughness, are relatively low. Meanwhile, the epoxy resin provides a molded product having high heat resistance, a high strength, and high toughness, but involves a problem in that the viscosity of the resin is relatively high.

A bisphenol A-type epoxy resin is used as the matrix resin of the fiber-reinforced composite material because the resin is excellent in economical efficiency and physical properties. However, a bisphenol F-type epoxy resin having a low viscosity is also used for improving impregnability into the fibers. However, the bisphenol F-type epoxy resin contains an epoxy group-containing component that is trifunctional or more owing to its production method, and hence provides a resin composition showing a fast gelation rate, that is, a large viscosity increase ratio at the time of the mixing of a curing agent and a curing accelerator. Accordingly, stable impregnability into the fibers is impaired in a process in which a long-term impregnation step is required.

In Patent Literature 1, there is a proposal of a low-viscosity resin composition for a fiber-reinforced composite material using a bisphenol F-type epoxy resin. In addition, in Patent Literature 2, there is a proposal of a low-viscosity resin composition for a fiber-reinforced composite material obtained by using a high-purity bisphenol F-type epoxy resin. However, in each of those literatures, no reference is made to each component in the bisphenol F-type epoxy resin, and no reference is made to the viscosity increase ratio of the resin composition.

In Patent Literature 3, an attempt is made to achieve both a reduction in viscosity increase ratio and fast curability in a resin composition formed of an epoxy resin and an acid anhydride-based curing agent, the resin composition serving as a matrix resin to be used in the pultrusion molding method, through the use of a specific curing accelerator. However, in order that the viscosity increase ratio may be further reduced and hence impregnability that is stable over a long time period may be secured, attention needs to be paid to the amount of each component in the bisphenol F-type epoxy resin.

In each of Patent Literatures 4 and 5, there is a description of a reduction in viscosity of a resin composition through the use of an alicyclic epoxy resin or a reactive diluent, such as an aliphatic glycidyl ether. The alicyclic epoxy resin has a low viscosity and provides a molded product having high heat resistance after its curing, but involves a problem in that the toughness of the molded product is low owing to the high crosslink density of the resin. The reactive diluent, such as the aliphatic glycidyl ether, has a low viscosity but involves a problem in that the heat resistance of a cured product of the resin composition reduces.

In each of Patent Literatures 6 and 7, a reduction in viscosity is achieved by blending a resin composition formed of an epoxy resin and an acid anhydride or an amine-based curing agent with a radical-polymerizable compound, such as acrylic acid. However, in each of those literatures, a radical-polymerizable compound containing an acid group is used, and hence a reaction between an epoxy group and a carboxyl group advances at the time of the mixing of all components. Accordingly, an increase in viscosity based on an increase in molecular weight occurs, and hence a problem in terms of the stability of a long-term impregnation step occurs.

With regard to the matrix resin of the fiber-reinforced composite material, an attempt has been made to achieve both an improvement in impregnability by a reduction in viscosity of a resin composition and the impartment of heat resistance to a molded product. However, in addition to the foregoing, an improvement in toughness of the molded product, in particular, an improvement in tensile elongation amount thereof has been further desired.

CITATION LIST

Patent Literature

[PTL 1] JP 07-268320 A
[PTL 2] JP 2004-285148 A
[PTL 3] JP 5028903 B2
[PTL 4] JP 2013-1711 A
[PTL 5] JP 2014-167102 A
[PTL 6] JP 4872139 B2
[PTL 7] JP 5397265 B2

SUMMARY OF INVENTION

An object of the present invention is to provide a resin composition to be suitably used as the matrix resin of a fiber-reinforced composite material excellent in fatigue resistance because of the following reasons: the resin composition has satisfactory impregnability into reinforcing fibers based on a low viscosity and a small increase in viscosity even in a long-term impregnation step, and the toughness of a molded product obtained at the time of its curing is high.

The inventors of the present invention have made an investigation for solving the problems. As a result, the inventors have paid attention to the amount of each component present in a phenol novolac-type epoxy resin, and have found that a molded product that has a low viscosity, shows a small increase in viscosity over long time period, and has high toughness at the time of its curing is obtained by reducing the amount of a polynuclear body, and hence the problems are solved. Thus, the inventors have completed the present invention.

That is, according to one embodiment of the present invention, there is provided a resin composition for a fiber-reinforced composite material, including, as essential components: an epoxy resin (A); an acid anhydride-based curing agent (B); and an imidazole-based curing accelerator (C), wherein the resin composition has a viscosity at 25° C. measured with an E-type viscometer in a range of from 50 mPa·s to 800 mPa·s, and shows a viscosity increase ratio after a lapse of 8 hr at 25° C. of 200% or less, wherein 50 mass % or more of the epoxy resin (A) includes a phenol novolac-type epoxy resin containing a compound represented by the following general formula (1) and a compound represented by the following general formula (2), and wherein, in gel permeation chromatography measurement, the phenol novolac-type epoxy resin contains a body corresponding to m=0 of the compound represented by the following general formula (1) at a ratio of 75% by area or more and a body corresponding to m=1 thereof at a ratio of 6% by area or less:

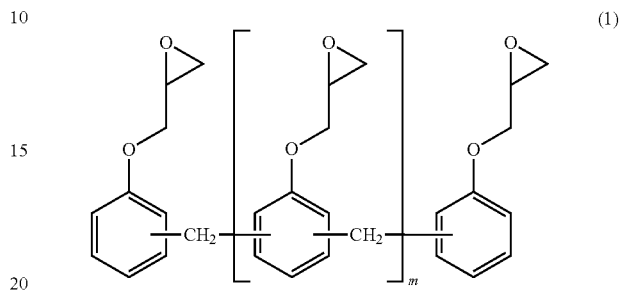

where m represents an integer of 0 or more, and represents from 0 to 5;

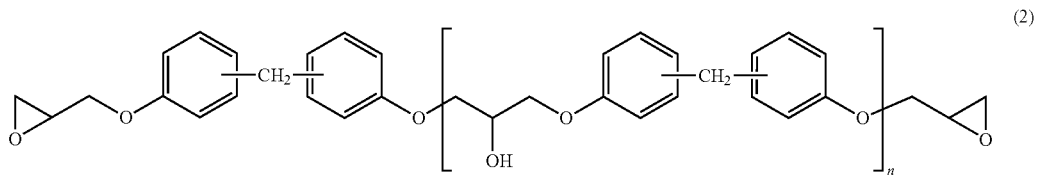

where n represents an integer of 0 or more, and represents from 0 to 2.

In the embodiment of the present invention, it is preferred that, in the gel permeation chromatography measurement, the phenol novolac-type epoxy resin contain a body corresponding to n=1 of the compound represented by the general formula (2) at a ratio of 8% by area or more and 16% by area or less.

In the embodiment of the present invention, it is more preferred that the resin composition for a fiber-reinforced composite material further include a radical-polymerizable monomer (D) that is free of an acid group and that is liquid at 25° C. in addition to the epoxy resin (A), the acid anhydride-based curing agent (B), and the imidazole-based curing accelerator (C), wherein a blending amount of the radical-polymerizable monomer (D) is from 5 parts by mass to 25 parts by mass with respect to 100 parts by mass of a total amount of the component (A), the component (B), the component (C), and the component (D).

According to other embodiments of the present invention, there are provided a fiber-reinforced composite material, which is obtained by blending the above-mentioned resin composition for a fiber-reinforced composite material with reinforcing fibers, and a molded body, which is obtained by molding the fiber-reinforced composite material by a wet lay-up molding method, a pultrusion molding method, or a filament winding molding method.

In the fiber-reinforced composite material, it is preferred that a volume content of the reinforcing fibers be from 50% to 70%.

Other preferred aspects of the present invention are described below.

Another aspect of the present invention is a resin composition for a fiber-reinforced composite material, including, as essential components: an epoxy resin (A); an acid anhydride-based curing agent (B); and an imidazole-based curing accelerator (C), wherein the resin composition has a viscosity at 25° C. measured with an E-type viscometer in a range of from 50 mPa·s to 800 mPa·s, and shows a viscosity increase ratio after a lapse of 8 hr at 25° C. of 200% or less, and wherein 50 parts by mass or more of the epoxy resin (A) out of 100 parts by mass thereof includes a phenol novolac-type epoxy resin represented by the general formula (1) and containing, in gel permeation chromatography measurement, a dinuclear body at a ratio of 75% by area or more and a trinuclear body at a ratio of 6% by area or less.

Still another aspect of the present invention is the resin composition for a fiber-reinforced composite material, wherein the epoxy resin (A) further includes a phenol novolac-type epoxy resin represented by the general formula (2) and containing, in the gel permeation chromatography measurement, a body corresponding to $n=1$ at a ratio of 8% by area or more and 16% by area or less.

The resin composition for a fiber-reinforced composite material of the present invention has a low viscosity, shows a small increase in viscosity even in a long-term impregnation step, has satisfactory impregnability into reinforcing fibers, and provides a molded product having a high tensile elongation amount at the time of its curing.

DESCRIPTION OF EMBODIMENTS

Figure 1:
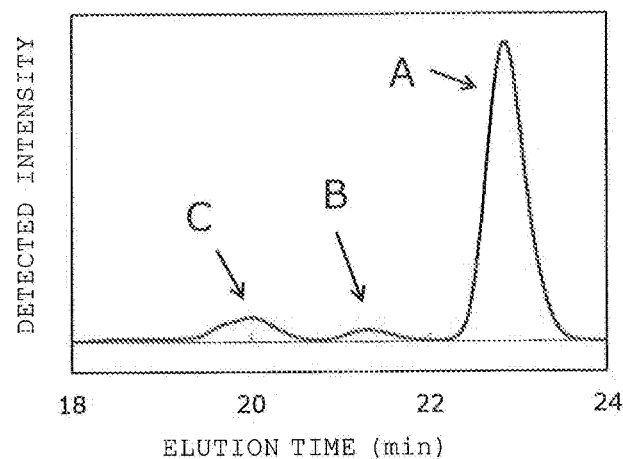
FIG. 1 is a GCP chart of an epoxy resin of Synthesis Example 2.
Figure 2:
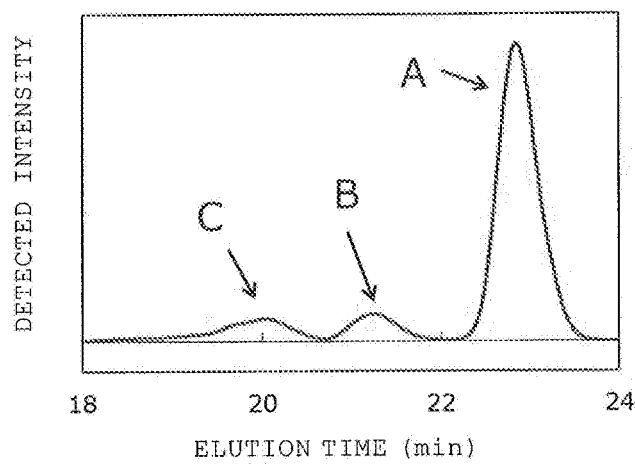
FIG. 2 is a GPC chart of a phenol novolac-type epoxy resin YDF-170 having a conventional molecular weight distribution.

An embodiment of the present invention is described in detail below.

A resin composition for a fiber-reinforced composite material of the present invention contains an epoxy resin (A), an acid anhydride-based curing agent (B), and an imidazole-based curing accelerator (C) as essential components. The epoxy resin (A), the acid anhydride-based curing agent (B), and the imidazole-based curing accelerator (C) are hereinafter sometimes referred to as "component (A)", "component (B)", and "component (C)", respectively.

50 Mass % or more of the epoxy resin (A) to be used in the present invention is a phenol novolac-type epoxy resin containing a compound represented by the general formula (1) and a compound represented by the general formula (2). In addition, in gel permeation chromatography (GPC) measurement, the phenol novolac-type epoxy resin needs to contain a body corresponding to $m=0$ of the compound represented by the general formula (1) at a ratio of 75% by area or more and a body corresponding to $m=1$ thereof at a ratio of 6% by area or less. Here, the body corresponding to $m=0$ refers to such a component that in the general formula (1), $m=0$, and is sometimes referred to as "dinuclear body" because the body has two benzene nuclei. Similarly, the body corresponding to $m=1$ refers to such a component that in the general formula (1), $m=1$, and is sometimes referred to as "trinuclear body" because the body has three benzene nuclei. When the content of the body corresponding to $m=0$ (dinuclear body) is less than 75% by area, the viscosity of the resin composition increases and hence its impregnability into fibers is impaired. When the content of the body corresponding to $m=1$ (trinuclear body) is 5% by area or more, a resin composition showing a fast gelation rate, that is, a large viscosity increase ratio at the time of the mixing of the acid anhydride-based curing agent and the imidazole-based curing accelerator is obtained, and hence stable impregnability into the fibers is impaired in a process in which a long-term impregnation step is required. The content of the body corresponding to $m=0$ is more preferably 80.0% by area or more.

A form particularly preferred for obtaining the effects of the present invention is as follows: 50 mass % or more of the epoxy resin (A) is more preferably a phenol novolac-type epoxy resin containing the body corresponding to $m=0$ represented by the general formula (1) at a ratio of 75% by area or more and the body corresponding to $m=1$ represented by the formula at a ratio of 6% by area or less, and containing a body corresponding to $n=1$ represented by the general formula (2) at a ratio of 8% by area or more and 16% by area or less. When the resin contains the body corresponding to $n=1$ at a ratio of 8% by area or more and 16% by area or less, the resin composition suppresses the deposition of the crystal of the epoxy resin at the time of the mixing of the acid anhydride-based curing agent and the imidazole-based curing accelerator while maintaining its low viscosity, and hence can be applied to a process in which a longer-term impregnation step is required.

The contents of bodies corresponding to $m=0, 1, 2 \ldots$ in the general formula (1) depend on a phenol novolac resin to be used as a raw material, and a value for m can be reduced by using a phenol novolac resin having a smaller average value of m. A resin having a sufficiently high content of the body corresponding to $m=0$ is bisphenol F, and the phenol novolac resin to be used in the present invention may be bisphenol F. In the present invention, a phenol novolac resin having a content of a polynuclear body corresponding to $m=1$ or more of 5% by area or less is preferably used as a raw material.

In addition, the contents of bodies corresponding to $n=0$, 1, and 2 in the general formula (2) depend on epoxidation conditions, and are determined by a molar ratio "epichlorohydrin (ECH)/phenol novolac resin (PN)" at the time of loading. As the ECH/PN ratio increases, a value for n can be reduced. On the other hand, in order that the crystallization of the epoxy resin due to an increase in content of the body corresponding to $n=0$ may be suppressed, the ECH/PN ratio is preferably from 1.5 to 8.0, more preferably from 2.5 to 5.5. When the ECH/PN ratio is less than 1.5, the average value of n increases, and hence the viscosity of an epoxy resin to be obtained increases to cause defective impregnation of the resin composition into reinforcing fibers. Meanwhile, a case in which the ECH/PN ratio is more than 8.0 is not desirable because an epoxy resin having a high content of the body corresponding to $n=0$, that is, showing remarkable crystal deposition is obtained.

In the epoxy resin (A) to be used in the present invention, any other epoxy resin having two or more epoxy groups in a molecule thereof may be used in combination with the phenol novolac-type epoxy resin to the extent that the object of the present invention is not impaired as long as the content of the other epoxy resin is less than 50 mass %. There may be used, for example: bisphenol-type epoxy resins, such as a bisphenol A-type epoxy resin, a bisphenol E-type epoxy resin, a bisphenol S-type epoxy resin, a bisphenol Z-type epoxy resin, and an isophorone bisphenol-type epoxy resin, or halogen and alkyl substitutes, and hydrogenated products of those bisphenols, and, in addition to the monomers, high-molecular weight bodies of those bisphenols each having a plurality of repeating units; alkylene oxide adducts of glycidyl ethers; novolac-type epoxy resins, such as a phenol novolac-type epoxy resin, a cresol novolac-type epoxy resin, and a bisphenol A novolac-type epoxy resin; alicyclic epoxy resins, such as 3,4-epoxy-6-methylcyclohexylmethyl-3,4-epoxy-6-methylcyclohexane carboxylate, 3,4-epoxycyclohexylmethyl-3,4-epoxycyclohexane carboxylate, and 1-epoxyethyl-3,4-epoxycyclohexane; aliphatic epoxy resins, such as trimethylolpropane polyglycidyl ether, pentaerythritol polyglycidyl ether, and a polyoxyalkylene diglycidyl ether; glycidyl esters, such as diglycidyl phthalate, diglycidyl tetrahydrophthalate, and dimer acid glycidyl ester; and glycidylamines, such as tetraglycidyldiaminodiphenylmethane, tetraglycidyldiaminodiphenylsulfone, triglycidylaminophenol, triglycidylaminocresol, and tetraglycidylxylylenediamine. Of those epoxy resins, an epoxy resin having two epoxy groups in a molecule thereof is preferred from the viewpoint of a viscosity increase ratio, and a polyfunctional epoxy resin is not preferred. Those resins may be used alone or in combination thereof.

For example, succinic anhydride, maleic anhydride, phthalic anhydride, tetrahydrophthalic anhydride, methyltetrahydrophthalic anhydride, hexahydrophthalic anhydride, methylhexahydrophthalic anhydride, nadic anhydride, hydrogenated nadic anhydride, trimellitic anhydride, hydrogenated trimellitic anhydride, pyromellitic anhydride, hydrogenated pyromellitic anhydride, and cyclopentanetetracarboxylic acid dianhydride may be applied as the acid anhydride-based curing agent (B) to be incorporated into the resin composition for a fiber-reinforced composite material of the present invention, and those curing accelerators and acid anhydrides may be used in combination thereof as required. The curing agent is preferably blended in a usage amount in the range of from 0.8 equivalent to 1.2 equivalents with respect to the epoxy equivalent of the epoxy resin (A).

The content of the imidazole-based curing accelerator (C) to be incorporated into the resin composition for a fiber-reinforced composite material of the present invention is set to preferably from 0.01 part by mass to 10 parts by mass, particularly preferably from 0.1 part by mass to 3.0 parts by mass with respect to 100 parts by mass of the amount of the acid anhydride-based curing agent (B). When the curing accelerator is incorporated in an amount in the range, the viscosity increase ratio of the resin composition at the time of the mixing of the curing agent and the curing accelerator is low, and a molded product having high heat resistance is obtained at the time of the heat curing of the resin composition.

In order that not only the impregnability of the resin composition of the present invention into the reinforcing fibers at the time of its mixing and the suppression of the viscosity increase ratio thereof but also the heat resistance at the time of the curing thereof may be further satisfied, it is preferred to use, as the imidazole-based curing accelerator (C), an imidazole-based compound, such as 2-methylimidazole, 1,2-dimethylimidazole, 2-ethyl-4-methylimidazole, 1-benzyl-2-methylimidazole, 2-undecylimidazole, 2-heptadecylimidazole, 2-phenylimidazole, 2-phenyl-4-methylimidazole, 2-phenyl-6-4',5'-dihydroxymethylimidazole, or 1-cyanoethyl-2-ethyl-4-methylimidazole A radical-polymerizable monomer (D) that is free of an acid group and that is liquid at 25° C., which is desirably incorporated into the resin composition for a fiber-reinforced composite material of the present invention, is not a compound substantially containing an acid group, such as a carboxyl group, a phosphate group, or a sulfonate group. Any such acid group has reactivity with an epoxy group even at room temperature, and hence increases the viscosity increase ratio of a molecular weight when mixed with the epoxy resin to impair stable impregnability into the fibers.

As the radical-polymerizable monomer (D) that is free of an acid group and that is liquid at 25° C., for example, a vinyl compound, an acrylate compound, or a methacrylate compound having a double bond in a molecule thereof may be used. For example, there may be applied a vinyl compound, such as styrene, methylstyrene, ethylstyrene, halogenated styrene, or divinylbenzene. As the acrylate compound or the methacrylate compound, there may be applied: an acrylate compound or a methacrylate compound of 1,4-butanediol, 1,5-pentanediol, 3-methyl-1,5-pentanediol, 1,6-hexanediol, neopentyl glycol, 1,8-octanediol, 1,9-nonanediol, tricyclodecane dimethanol, ethylene glycol, polyethylene glycol, propylene glycol, dipropylene glycol, tripropylene glycol, polypropylene glycol, trimethylolpropane, pentaerythritol, dipentaerythritol, or the like; or an acrylate compound or a methacrylate compound of a diol obtained by adding 2 or more moles of ethylene oxide or propylene oxide to 1 mole of 1,6-hexanediol, bisphenol A, trimethylolpropane, or neopentyl glycol. Those compounds may be used in combination thereof as required.

The content of the radical-polymerizable monomer (D) is from 5 parts by mass to 25 parts by mass with respect to 100 parts by mass of the total amount of the component (A), the component (B), the component (C), and the component (D). A case in which the content is less than 5 parts by mass is not preferred because a tensile elongation amount is not improved. A case in which the content is more than 25 parts by mass is not preferred because a reduction in elastic modulus occurs at the time of the heat curing to provide a molded product having a low tensile strength, and the heat resistance of the molded product reduces.

In order that not only the impregnability of the resin composition into the reinforcing fibers at the time of its mixing and the suppression of the viscosity increase ratio thereof but also the heat resistance at the time of the curing thereof may be further satisfied, it is desirable that the radical-polymerizable monomer (D) be represented by the following general formula (3) and have a viscosity at 25° C. measured with an E-type viscometer of 800 mPa·s or less. When such monomer is used, the impregnability into the reinforcing fibers at the time of the mixing becomes excellent, and hence a fiber-reinforced composite material having a small number of voids is obtained at the time of the heat curing of the resin composition.

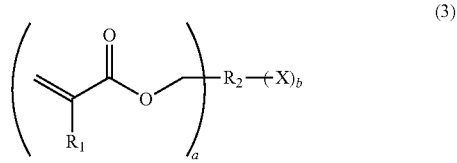

(3)

(In the formula, $R_1$'s each independently represent a hydrogen atom or a methyl group, X represents a functional group selected from a hydroxyl group, a methoxy group, an ethoxy group, a nitrile group, a cyano group, and a halogen group, a represents 2 or 3, b represents 0 or 1, and $R_2$ represents an a+b-valent hydrocarbon group that has 2 to 40 carbon atoms and may have an ether bond or an ester-bonding oxygen atom in itself.)

In addition, the composition of the present invention is preferably blended with a radical-polymerizable initiator (E) for smoothly advancing radical polymerization. As the radical-polymerizable initiator (E), an azo compound or an organic peroxide that generates a radical through heating may be used. Examples thereof include 2,2'-azobisisobutyronitrile, 1,1'-azobis(cyclohexane-1-carbonitrile), methyl ethyl ketone peroxide, methyl cyclohexanone peroxide, methyl acetoacetate peroxide, acetyl acetone peroxide, 1,1-bis(t-butylperoxy)-3,3,5-trimethylcyclohexane, 1,1-bis(t-hexylperoxy)cyclohexane, 1,1-bis(t-hexylperoxy)-3,3,5-trimethylcyclohexane, 1,1-bis(t-butylperoxy)cyclohexane, 2,2-bis(4,4-di-t-butylperoxycyclohexyl)propane, 1,1-bis(t-butylperoxy)cyclododecane, n-butyl 4,4-bis(t-butylperoxy) valerate, 2,2-bis(t-butylperoxy)butane, 1,1-bis(t-butylperoxy)-2-methylcyclohexane, t-butyl hydroperoxide, P-menthanehydroperoxide, 1,1,3,3-tetramethylbutyl hydroperoxide, t-hexyl hydroperoxide, dicumyl peroxide, 2,5-dimethyl-2,5-bis(t-butylperoxy)hexane, α,α'-bis(t-butylperoxy)diisopropylbenzene, t-butylcumylperoxide, di-t-butyl peroxide, 2,5-dimethyl-2,5-bis(t-butylperoxy)hexyne-3, isobutyryl peroxide, 3,5,5-trimethylhexanoyl peroxide, octanoyl peroxide, lauroyl peroxide, cinnamic acid peroxide, m-toluoyl peroxide, benzoyl peroxide, diisopropyl peroxydicarbonate, bis(4-t-butylcyclohexyl) peroxydicarbonate, di-3-methoxybutyl peroxydicarbonate, di-2-ethylhexyl peroxydicarbonate, di-sec-butyl peroxydicarbonate, di(3-methyl-3-methoxybutyl) peroxydicarbonate, di(4-t-butylcyclohexyl) peroxydicarbonate, α,α'-bis(neodecanoylperoxy) diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 2,5-dimethyl-2,5-bis(2-ethylhexanoylperoxy) hexane, 1,1,3,3-tetramethylbutyl peroxy-2-ethylhexanoate, 1-cyclohexyl-1-methylethyl peroxy-2-ethylhexanoate, t-hexyl peroxy-2-ethylhexanoate, t-butylperoxy-2-ethylhexanoate, t-butyl peroxyisobutyrate, t-butyl peroxymaleic acid, t-butyl peroxylaurate, t-butyl peroxy-3,5,5-trimethylhexanoate, t-butyl peroxy isopropyl monocarbonate, t-butyl peroxy-2-ethylhexyl monocarbonate, 2,5-dimethyl-2,5-bis(benzoylperoxy) hexane, t-butyl peroxyacetate, t-hexyl peroxybenzoate, t-butyl peroxy-m-toluoyl benzoate, t-butyl peroxybenzoate, bis(t-butylperoxy) isophthalate, t-butyl peroxy allyl monocarbonate, and 3,3', 4,4'-tetra(t-butylperoxycarbonyl)benzophenone. In particular, the radical-polymerizable initiator (E) for obtaining the effects of the present invention is preferably a compound having a 10-hr half-life temperature of from 60° C. to 140° C., more preferably a compound having a 10-hr half-life temperature of from 70° C. to 110° C. When any such compound is used, the viscosity increase ratio of the resin composition at the time of the mixing of the curing agent and the curing accelerator is suppressed, and hence a molded product excellent in heat resistance and toughness is obtained at the time of the heat curing of the resin composition.

The content of the radical-polymerizable initiator (E) to be incorporated into the resin composition for a fiber-reinforced composite material is set to preferably from 0.005 part by mass to 5.0 parts by mass, particularly preferably from 0.1 part by mass to 2.0 parts by mass with respect to 100 parts by mass of the radical-polymerizable monomer (D). When the addition amount is less than 0.005 part by mass, the degree of curing of the radical-polymerizable monomer reduces, and hence the heat resistance and toughness of the molded product are impaired. When the addition amount is more than 5.0 parts by mass, the curing rate of the radical-polymerizable monomer is so fast that a resin composition showing a high viscosity increase ratio is obtained and hence stable impregnability into the fibers is impaired.

The resin composition for a fiber-reinforced composite material of the present invention is produced by uniformly mixing the component (A), the component (B), the component (C), and the like described above. The resultant resin composition for a fiber-reinforced composite material has a viscosity at 25° C. measured with a cone plate-type E-type viscometer in the range of from 50 mPa·s to 1,500 mPa·s, has satisfactory impregnability into the reinforcing fibers, and hardly causes resin dripping from the fibers even after the impregnation. Further, the viscosity increase ratio of the resin composition for a fiber-reinforced composite material of the present invention after a lapse of 6 hr under the conditions of a temperature of 25° C. and an air atmosphere or an inert gas atmosphere is 200% or less. Accordingly, even in a molding method including a long-term impregnation step, stable impregnability into the reinforcing fibers can be secured, and hence a fiber-reinforced composite material having a small number of voids is obtained at the time of the curing of the resin composition.

In addition, the resin composition for a fiber-reinforced composite material of the present invention may be blended with any other curable resin. Examples of such curable resin include, but are not limited to, an unsaturated polyester resin, a curable acrylic resin, a curable amino resin, a curable melamine resin, a curable urea resin, a curable cyanate ester resin, a curable urethane resin, a curable oxetane resin, and a curable epoxy/oxetane composite resin.

The resin composition for a fiber-reinforced composite material of the present invention is suitably used in a fiber-reinforced composite material obtained by a wet lay-up molding method, a pultrusion molding method, a filament winding molding method, or a transfer mold molding method.

Although a method of producing a fiber-reinforced composite material from the resin composition for a fiber-reinforced composite material of the present invention is not particularly limited, molding is particularly preferably performed by any one of the following methods because a fiber-reinforced composite material having a small number of voids and having a high strength is obtained: the wet lay-up method involving arranging and laminating a fabric of the reinforcing fibers in a molding die, applying the resin composition to the fabric, and then subjecting the resultant to heat molding to provide a cured molded body; the pultrusion method involving continuously passing the reinforcing fibers through an impregnation layer filled with the curable resin composition, and then passing the resultant through a die while heating the resultant to continuously provide a rod-shaped molded body; the filament winding method involving continuously passing the reinforcing fibers through the impregnation layer filled with the curable resin composition, then winding the resultant around a mandrel, and subjecting the resultant to heat molding to provide a columnar and hollow molded body; and the transfer mold method involving loading the reinforcing fibers and the resin composition into a transfer molding machine, and subjecting the mixture to heat molding.

The reinforcing fibers to be used together with the resin composition for a fiber-reinforced composite material of the present invention are selected from glass fibers, aramid fibers, carbon fibers, boron fibers, and the like. Of those, carbon fibers are preferably used for obtaining a fiber-reinforced composite material excellent in strength.

The volume content of the reinforcing fibers in a molded body including the resin composition for a fiber-reinforced composite material of the present invention and the reinforcing fibers is preferably from 50% to 70%, and more preferably falls within the range of from 53% to 68% because a molded body having a small number of voids and having a high volume content of the reinforcing fibers is obtained, and hence a molded material having an excellent strength is obtained.

EXAMPLES

Next, the present invention is specifically described by way of Examples. However, the present invention is not limited to the following Examples without departing from the gist thereof. The term "part(s)" representing a blending amount means "part(s) by mass" unless otherwise stated. In addition, the unit of an epoxy equivalent is g/eq.

A molecular weight distribution was measured by using gel permeation chromatography (GPC). A main body (HLC-8220GPC manufactured by Tosoh Corporation) including columns (TSKgel G4000HXL, TSKgel G3000HXL, and TSKgel G2000HXL manufactured by Tosoh Corporation) connected in series was used, and the temperature of each of the columns was set to 40° C. Tetrahydrofuran was used as an eluent and its flow rate was set to 1 ml/min. The measurement was performed by using a refractive index (RI) detector as a detector. The content of the body corresponding to m=0, the content of the body corresponding to m=1, and the content of the body corresponding to n=1 were each determined from the % by area of a peak.

Each of the components used in Examples is abbreviated as described below.
YDF-170: bisphenol F-type epoxy resin (manufactured by Nippon Steel & Sumikin Chemical Co., Ltd., viscosity (25° C.): 2,600 mPa·s, content of dinuclear body: 79.9% by area, content of trinuclear body: 8.5% by area, content of body corresponding to n=1: 11.5%, epoxy equivalent: 170 g/eq)
YD-128: bisphenol A-type epoxy resin (manufactured by Nippon Steel & Sumikin Chemical Co., Ltd., viscosity (25° C.): 13,000 mPa·s)
MTH: methyltetrahydrophthalic anhydride (acid anhydride group equivalent: 166, viscosity (25° C.): 53 mPa·s)
MHH: methylhexahydrophthalic anhydride (acid anhydride group equivalent: 168, viscosity (25° C.): 61 mPa·s)
MH700: mixture having a ratio of hexahydrophthalic anhydride/methylhexahydrophthalic anhydride of 30/70
EMZ: 2-ethyl-4-methylimidazole
DMZ: 1,2-dimethylimidazole
PEGDA: polyethylene glycol diacrylate (viscosity (25° C.): 13 mPa·s)
TMPTA: trimethylolpropanetriacrylate (viscosity (25° C.): 110 mPa·s)
BPO: benzoyl peroxide
tBuPOB: t-butyl peroxybenzoate Synthesis Example 1

3,010 Parts of phenol and 9 parts of oxalic acid dihydrate were loaded into a four-necked glass separable flask including a stirring apparatus, a temperature gauge, a cooling tube, and a nitrogen gas-introducing apparatus. While a nitrogen gas was introduced into the flask, the mixture was stirred, and a temperature was increased by performing heating. The dropping of 43 parts of 37.4% formalin was started at 80° C., and the dropping was completed in 30 min. Further, a reaction was performed for 3 hr while a reaction temperature was kept at 92° C. While water produced by the reaction was removed to the outside of the system, the temperature was increased to 110° C. Remaining phenol was recovered at 160° C. under reduced pressure. Thus, 108 parts of a phenol novolac resin was obtained. The content of a dinuclear body (bisphenol F) in the resultant phenol novolac resin measured by GPC was 97.0% by area.

Synthesis Example 2

100 Parts of the phenol novolac resin of Synthesis Example 1, 330 parts of epichlorohydrin (ECH/PN molar ratio=3.5), and 3 parts of water were loaded into the same apparatus as that of Synthesis Example 1, and a temperature was increased to 50° C. while the mixture was stirred. 2.5 Parts of a 49% aqueous solution of sodium hydroxide was loaded into the mixture to perform a reaction for 3 hr. The temperature was increased to 64° C., and a pressure reduction was performed to such an extent that the reflux of the water occurred. 74 Parts of a 49% aqueous solution of sodium hydroxide was dropped into the resultant over 3 hr to perform a reaction. The temperature was increased to 70° C. and dehydration was performed. The temperature was set to 135° C. and remaining epichlorohydrin was recovered. The pressure was returned to normal pressure, and 189 parts of MIBK was added to dissolve the residue. 180 Parts of ion-exchanged water was added to the solution, and the mixture was stirred and left at rest, followed by the removal of salt produced as a by-product through its dissolution in water. Next, 5.7 parts of a 49% aqueous solution of sodium hydroxide was loaded into the remainder, and a purification reaction was performed by subjecting the mixture to a stirring reaction at 80° C. for 90 min. MIBK was added to the resultant, and ionic impurities were removed by washing the mixture with water several times, followed by the recovery of the solvent. Thus, a novolac-type epoxy resin was obtained.

The content of the body corresponding to m=0, the content of the body corresponding to m=1, and the content of the body corresponding to n=1 in the epoxy resin measured by GPC were 84.1% by area, 4.1% by area, and 11.6%, respectively, and the epoxy equivalent of the epoxy resin was 169 g/eq. The name of the epoxy resin is defined as EPN-1. A chart obtained by the GPC measurement is shown in FIG. 1.

Synthesis Example 3

3,010 Parts of phenol and 9 parts of oxalic acid dihydrate were loaded into a four-necked glass separable flask including a stirring apparatus, a temperature gauge, a cooling tube, and a nitrogen gas-introducing apparatus. While a nitrogen gas was introduced into the flask, the mixture was stirred, and a temperature was increased by performing heating. The dropping of 53 parts of 37.4% formalin was started at 80° C., and the dropping was completed in 30 min. Further, a reaction was performed for 3 hr while a reaction temperature was kept at 92° C. While water produced by the reaction was removed to the outside of the system, the temperature was increased to 110° C. Remaining phenol was recovered at 160° C. under reduced pressure. Thus, 134 parts of a phenol novolac resin was obtained. The content of a dinuclear body (bisphenol F) in the resultant phenol novolac resin measured by GPC was 96.4% by area.

Synthesis Example 4

A novolac-type epoxy resin was obtained by performing the same operation as that of Synthesis Example 2 except that the phenol novolac resin of Synthesis Example 3 was used instead of the phenol novolac resin of Synthesis Example 1 used in Synthesis Example 2. The content of the body corresponding to m=0, the content of the body corresponding to m=1, and the content of the body corresponding to n=1 in the epoxy resin measured by GPC were 81.9% by area, 5.5% by area, and 11.5%, respectively, and the epoxy equivalent of the epoxy resin was 169 g/eq. The name of the epoxy resin is defined as EPN-2.

Example 1

(Production of Resin Composition for Fiber-Reinforced Composite Material)

53 Parts of EPN-1 obtained in Synthesis Example 2 serving as the component (A), 47 parts of MTH serving as the component (B), and 0.4 part of EMZ serving as the component (C) were loaded into a 150-milliliter plastic container, and were mixed while being stirred with a vacuummixer "AWATORI RENTARO" (manufactured by Thinky Corporation) under room temperature for 5 min. Thus, a resin composition for a fiber-reinforced composite material was obtained.

(Production of Test Piece for Glass Transition Temperature Measurement)

The resin composition for a fiber-reinforced composite material was cast into a die measuring 80 mm long by 80 mm wide in which a 4-millimeter thick spacer hollowed out into a flat plate shape had been arranged, and the resin composition was cured at 100° C. for 1 hr and then at 120° C. for 3 hr. After that, the cured product was cut into a size measuring 50 mm by 10 mm with a table band saw and used in glass transition temperature measurement to be described later.

(Production of Tensile Test Piece)

The resin composition for a fiber-reinforced composite material was cast into a die measuring 180 mm long by 180 mm wide in which a spacer hollowed out into a dumbbell shape had been arranged, and the resin composition was cured at 100° C. for 1 hr and then at 120° C. for 3 hr to produce a test piece to be subjected to a tensile test in conformity with a 1B-type test piece described in JIS 7161-2. The test piece was used in the measurement of a tensile test to be described later.

Examples 2 to 15 and Comparative Examples 1 to 5

Resin compositions for fiber-reinforced composite materials were each produced under the same mixing conditions as those of Example 1 except that respective raw materials were used as the components (A) to (E) according to the composition shown in each of Table 1 and Table 2. In addition, test pieces to be subjected to tensile tests and test pieces for glass transition temperature measurement were each produced by the same molding approach as that of Example 1.

(Measurement of Initial Viscosity, Viscosity after Lapse of 8 hr, and Viscosity Increase Ratio)

A value for a viscosity at 25° C. was measured with a cone plate-type E-type viscometer. A resin composition for a fiber-reinforced composite material was prepared, and 1.1 mL of the resin composition was used in measurement. A value after a lapse of 60 sec from the start of the measurement was defined as a value for an initial viscosity. In addition, the prepared resin composition for a fiber-reinforced composite material was left at rest in a thermobath set to 25° C. for 8 hr, and then its viscosity was similarly measured with the cone plate-type E-type viscometer. A value after a lapse of 60 sec from the start of the measurement was defined as a value for a viscosity after a lapse of 8 hr. In addition, a viscosity increase ratio was calculated by using an expression "100×(viscosity after lapse of 8 hr)/(initial viscosity)."

(Glass Transition Temperature Measurement)

A test piece for glass transition temperature measurement was subjected to measurement with a dynamic viscoelasticity tester under the conditions of a rate of temperature increase of 5° C./min, a bending mode, and a measurement frequency of 10 Hz, and the maximum value of its loss modulus (E") was defined as a glass transition temperature.

(Measurement of Amount of Tensile Strain at Break)

A tensile test piece was subjected to measurement with AUTOGRAPH AGS-X (manufactured by Shimadzu Corporation) by an approach in conformity with JIS 7161-2, and an amount of tensile strain at break was determined from a displacement amount at the time point when the test piece broke.

The results of the tests are shown in Table 1 and Table 2.

TABLE 1

| Component | Compound name | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| (A) | EPN-1 | (part(s) by mass) | 53 | 53 | 47 | 47 | 47 | 53 | 54 | 43 | 44 | |
| | EPN-2 | (part(s) by mass) | | | | | | | | | | 53 |
| | YDF-170 | (part(s) by mass) | | | | | | | | | | |
| | YD-128 | (part(s) by mass) | | | | | | | | | | |
| (B) | MTH | (part(s) by mass) | 47 | 47 | 42 | 42 | 42 | | | | | 47 |
| | MHH | (part(s) by mass) | | | | | | 47 | | 38 | | |
| | MH700 | (part(s) by mass) | | | | | | | 46 | | 38 | |
| (C) | EMZ | (part(s) by mass) | 0.4 | | 0.4 | 0.4 | 0.4 | 0.4 | 0.4 | | 0.4 | 0.4 |
| | DMZ | (part(s) by mass) | | 0.4 | | | | | | 0.4 | | |
| (D) | PEGDA | (part(s) by mass) | | | 11 | 11 | 7 | | | 19 | 18 | |

TABLE 1-continued

| Component | Compound name | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| | TMPTA | (part(s) by mass) | | | | | 4 | | | | | |
| (E) | BPO | (part(s) by mass) | | | 0.1 | | 0.1 | | | 0.1 | | |
| | tBuPOB | (part(s) by mass) | | | | 0.1 | | | | | 0.1 | |
| Physical property evaluation | Initial viscosity | (mPa · s) | 325 | 339 | 201 | 199 | 255 | 364 | 371 | 145 | 160 | 322 |
| | Viscosity after lapse of 6 hr | (mPa · s) | 481 | 536 | 314 | 279 | 390 | 626 | 627 | 258 | 264 | 498 |
| | Viscosity increase ratio | (%) | 148 | 158 | 156 | 140 | 153 | 172 | 169 | 178 | 165 | 155 |
| | Glass transition temperature | (° C.) | 119 | 122 | 105 | 102 | 107 | 135 | 134 | 122 | 125 | 121 |
| | Tensile strain at break | (%) | 4.0 | 3.7 | 6.6 | 7.6 | 6.6 | 3.9 | 3.2 | 5.8 | 7.9 | 4.0 |

TABLE 2

| Component | Compound name | | Example 11 | Example 12 | Example 13 | Example 14 | Example 15 | Comparative Example 1 | Comparative Example 2 | Comparative Example 3 | Comparative Example 4 | Comparative Example 5 |
|---|---|---|---|---|---|---|---|---|---|---|---|---|
| (A) | EPN-1 | (part(s) by mass) | | 43 | 44 | 39 | | | | | | |
| | EPN-2 | (part(s) by mass) | 47 | | | | 39 | | | | | |
| | YDF-170 | (part(s) by mass) | | | | | | 53 | 53 | 53 | 47 | 43 |
| | YD-128 | (part(s) by mass) | | 12 | 12 | 10 | 10 | | | | | 12 |
| (B) | MTH | (part(s) by mass) | | 45 | | 40 | 40 | 47 | 47 | | 42 | 47 |
| | MHH | (part(s) by mass) | | | | | | | | 47 | | |
| | MH700 | (part(s) by mass) | 42 | | 44 | | | | | | | |
| (C) | EMZ | (part(s) by mass) | 0.4 | 0.4 | | 0.4 | | 0.4 | | 0.4 | 0.4 | 0.4 |
| | DMZ | (part(s) by mass) | | | 0.4 | | 0.4 | | 0.4 | | | |
| (D) | PEGDA | (part(s) by mass) | 11 | | | 11 | 11 | | | | 11 | |
| | TMPTA | (part(s) by mass) | | | | | | | | | | |
| (E) | BPO | (part(s) by mass) | 0.1 | | | 0.1 | | | | | | |
| | tBuPOB | (part(s) by mass) | | | | | 0.1 | | | | 0.1 | |
| Physical property evaluation | Initial viscosity | (mPa · s) | 197 | 377 | 388 | 221 | 231 | 315 | 324 | 346 | 202 | 395 |
| | Viscosity after lapse of 6 hr | (mPa · s) | 335 | 524 | 563 | 294 | 356 | 712 | 716 | 862 | 527 | 833 |
| | Viscosity increase ratio | (%) | 170 | 139 | 145 | 133 | 154 | 226 | 221 | 249 | 261 | 211 |
| | Glass transition temperature | (° C.) | 125 | 105 | 131 | 105 | 104 | 123 | 124 | 136 | 100 | 104 |
| | Tensile strain at break | (%) | 6.3 | 3.5 | 3.5 | 5.9 | 6.4 | 3.5 | 4.1 | 4 | 6.5 | 3.7 |

The use of a phenol novolac-type epoxy resin including, at a content of 6% by area or less in measurement in gel permeation chromatography, a phenol novolac-type epoxy resin serving as a trinuclear body having three epoxy groups on average in a molecule thereof provides a resin composition that is suppressed in molecular weight increase rate in a state in which an acid anhydride and a curing agent are mixed, and hence shows a low viscosity increase ratio.

Also when the bisphenol A-type epoxy resin that can increase a glass transition temperature but has a high viscosity is added in an amount of less than 50 parts by mass out of 100 parts by mass of the epoxy resins (A), a viscosity after a lapse of 8 hr is 800 mPa·s or less, and hence satisfactory impregnability into reinforcing fibers can be maintained.

When a radical-polymerizable monomer that reduces a glass transition temperature, but can reduce the viscosity of a resin composition and increase the amount of tensile strain of a cured product thereof is added, a viscosity of 400 mPa·s or less can be maintained and the viscosity increase ratio of the resin composition can be suppressed for at least 8 hr from the start of the impregnation of the resin composition into reinforcing fibers. Accordingly, long-term production stability of a satisfactory fiber-reinforced composite material having a small number of voids in association with satisfactory impregnability into the reinforcing fibers is expressed.

INDUSTRIAL APPLICABILITY

The resin composition for a fiber-reinforced composite material of the present invention is suitably used in a fiber-reinforced composite material to be used in a wet lay-up molding method, a pultrusion molding method, or a filament winding molding method.

REFERENCE SIGNS LIST

A peak representing a body corresponding to m=0
B peak representing a body corresponding to m=1
C peak representing a body corresponding to n=1

The invention claimed is:

1. A resin composition for a fiber-reinforced composite material, comprising, as essential components:
an epoxy resin (A);
an acid anhydride-based curing agent (B);
an imidazole-based curing accelerator (C); and
a radical-polymerizable monomer (D) that is free of an acid group and that is liquid at 25° C. in addition to the epoxy resin (A), the acid anhydride-based curing agent (B), and the imidazole-based curing accelerator (C),
wherein a blending amount of the radical-polymerizable monomer (D) is from 5 parts by mass to 25 parts by mass with respect to 100 parts by mass of a total amount of the component (A), the component (B), the component (C), and the component (D),
the resin composition capable of being applied to or impregnated into reinforcing fibers in a wet lay-up molding method, a pultrusion molding method, or a filament winding molding method without using a solvent,
wherein 50 mass % or more of the epoxy resin (A) comprises a phenol novolac-type epoxy resin containing a compound represented by the following general formula (1) and a compound represented by the following general formula (2),
wherein, in gel permeation chromatography measurement, the phenol novolac-type epoxy resin contains a body corresponding to m=0 of the compound represented by the following general formula (1) at a ratio of 75% by area or more and a body corresponding to m=1 thereof at a ratio of 6% by area or less, and
wherein the composition has a viscosity (25° C.) measured with an E-type viscometer in a range of from 50 mPa·s to 800 mPa·s, and the composition shows a viscosity increase ratio (25° C.) after a lapse of 6 hr of 200% or less:

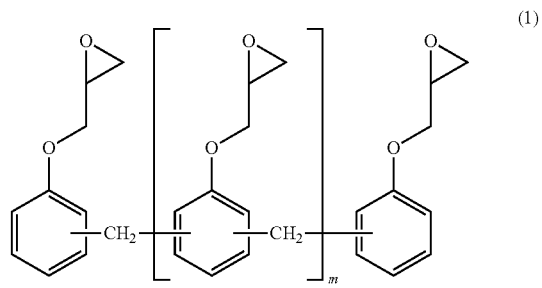

where m represents an integer of 0 or more, and represents from 0 to 5;

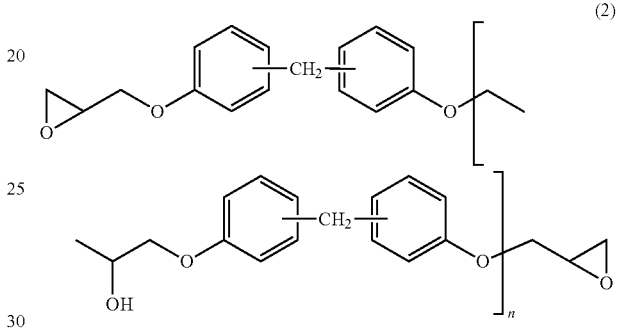

where n represents an integer of 0 or more, and represents from 0 to 2.

2. A resin composition for a fiber-reinforced composite material according to claim 1, wherein in the gel permeation chromatography measurement, the phenol novolac-type epoxy resin contains a body corresponding to n=1 of the compound represented by the general formula (2) at a ratio of 8% by area or more and 16% by area or less.

3. A fiber-reinforced composite material, which is obtained by blending the resin composition for a fiber-reinforced composite material of claim 1 with reinforcing fibers.

4. A fiber-reinforced composite material according to claim 3, wherein a volume content of the reinforcing fibers is from 50% to 70%.

5. A molded body, which is obtained by molding the fiber-reinforced composite material of claim 3 or 4 by a wet lay-up molding method, a pultrusion molding method, or a filament winding molding method.

* * * * *